(12) United States Patent
Chrzanowski et al.

(10) Patent No.: US 7,993,550 B2
(45) Date of Patent: Aug. 9, 2011

(54) METHOD OF RECYCLING FILTER MEDIA

(76) Inventors: Dan Chrzanowski, Clinton Township, MI (US); Brandon Chrzanowski, St. Clair Shores, MI (US)

( * ) Notice: Subject to any disclaimer, the term of this patent is extended or adjusted under 35 U.S.C. 154(b) by 0 days.

(21) Appl. No.: 12/258,284

(22) Filed: Oct. 24, 2008

(65) Prior Publication Data

US 2009/0108499 A1 Apr. 30, 2009

Related U.S. Application Data

(60) Provisional application No. 60/982,657, filed on Oct. 25, 2007.

(51) Int. Cl.
*B29C 45/17* (2006.01)

(52) U.S. Cl. ....... 264/36.1; 264/921; 264/914; 264/913; 521/40

(58) Field of Classification Search .................. 264/913, 264/914, 921; 521/40
See application file for complete search history.

(56) References Cited

U.S. PATENT DOCUMENTS

| | | | |
|---|---|---|---|
| 3,767,052 A * | 10/1973 | Shibasaki | 210/225 |
| 4,353,293 A * | 10/1982 | Illy | 99/283 |
| 5,125,333 A * | 6/1992 | Gourley, III | 100/94 |
| 5,158,182 A * | 10/1992 | Fischer-Helwig et al. | 209/135 |
| 2002/0033550 A1* | 3/2002 | Suehara | 264/140 |
| 2002/0153285 A1* | 10/2002 | Arakane et al. | 209/3 |
| 2005/0075616 A1* | 4/2005 | Holter | 604/332 |
| 2005/0241439 A1* | 11/2005 | Koningen et al. | 75/746 |
| 2006/0046004 A1* | 3/2006 | Ekart et al. | 428/34.1 |
| 2006/0054571 A1* | 3/2006 | Lopez | 210/783 |
| 2006/0254476 A1* | 11/2006 | MacDonald et al. | 108/53.3 |
| 2007/0117703 A1* | 5/2007 | Cavaliere et al. | 493/464 |

FOREIGN PATENT DOCUMENTS

JP 61021712 A * 1/1986
JP 2004100066 A * 4/2004

OTHER PUBLICATIONS

Derwnt abstract of JP6102712.*
Derwent abstract of JP2004100066.*

* cited by examiner

*Primary Examiner* — Christina Johnson
*Assistant Examiner* — Xue Liu
(74) *Attorney, Agent, or Firm* — Gifford, Krass, Sprinkle, Anderson & Citkowski, P.C.

(57) ABSTRACT

A method of recycling spent filter media is disclosed. The method can include providing a cloth, the cloth being spent polymer-base filter media, removing foreign solid particles from the cloth, washing the cloth, drying the cloth and processing the dried cloth to produce polymer-base particles that can be used to produce a component. The processing of the dried cloth can include densifying and/or granulating the dried cloth. In addition, the spent cloth can have been used as metal working filtration media and the foreign solid particles removed from the cloth using a brush. In some instances, the cloth is washed using a dry cleaning process and the granulating or densifying of the cloth produces particles that can be used in an injection molding machine.

13 Claims, 3 Drawing Sheets

METHOD OF RECYCLING FILTER MEDIA

CROSS-REFERENCE TO RELATED APPLICATION

This application claims priority of U.S. Provisional Patent Application Ser. No. 60/982,657 filed Oct. 25, 2007, which is incorporated herein by reference.

FIELD OF THE INVENTION

The present invention is related to a method of recycling filter media. In particular, the present invention relates to a method of recycling polymer-base filter media.

BACKGROUND OF THE INVENTION

Filter media separate or remove solid particles from a system by providing a fine physical barrier. Some filters are detachable or interchangeable units due to the need for regular service and/or replacement, and some filters are in the form of large permanent filter tanks. As material builds up on the filtration media, the efficiency of the filter decreases until such time when replacement is required.

Many filters and different types of filter media are currently made from polymers, and when such a filter reaches its useful life of service, the spent filter material is replaced and discarded into a landfill. In the alternative, the spent filter material can be burned in a waste incinerator.

The ever-expanding amount of waste generated by society is well known. In particular, the placement of polymer-base materials in landfills has steadily increased over the last four decades. This method of disposal for polymer-base filter media is generally viewed as objectionable since decomposition of polymer-base materials can lead to the leaching and/or leaking of chlorides, fluorides, oil, metals and the like into the surrounding land and possibly into groundwater supplies. In addition, burning of polymer-base materials in waste incinerators is similarly viewed as objectionable with respect to pollution of the atmosphere. As such, methods to recycle polymer-base materials are highly desirable. However, heretofore filter media made from polymer-base materials have not been recycled and thus have been discarded into landfills. Therefore, a method to recycle polymer-base filter media would be desirable.

SUMMARY OF THE INVENTION

A method of recycling spent filter media is disclosed. The method can include providing a cloth, the cloth being spent polymer-base filter media, removing foreign solid particles from the cloth, washing the cloth, drying the cloth and processing the dried cloth to produce polymer-base particles that can be used to produce a component. The processing of the dried cloth can include densifying and/or granulating the dried cloth. In addition, the spent cloth can have been used as metalworking filtration media and the foreign solid particles removed from the cloth using a brush. In some instances, the cloth is washed using a dry cleaning process and the granulating or densifying of the cloth produces particles that can be used in an injection molding machine.

DETAILED DESCRIPTION OF THE INVENTION

The present invention includes a method for recycling filter media. As such, the method has utility for reducing waste sent to and placed in landfills.

The method described herein includes taking filter media that has been used a predetermined amount and: (1) removing foreign solid particles from the filter media; (2) removing any excess liquid that remains within or on the filter media; (3) cleaning the filter media; and (4) granulating or densifying the cleaned filter media. The granulated or densified filter media can then be used for production of new items. In some instances the filter media is made from polymer-base materials. In other instances, the filter media is made from natural materials such as paper, cotton and the like.

Figure 1:
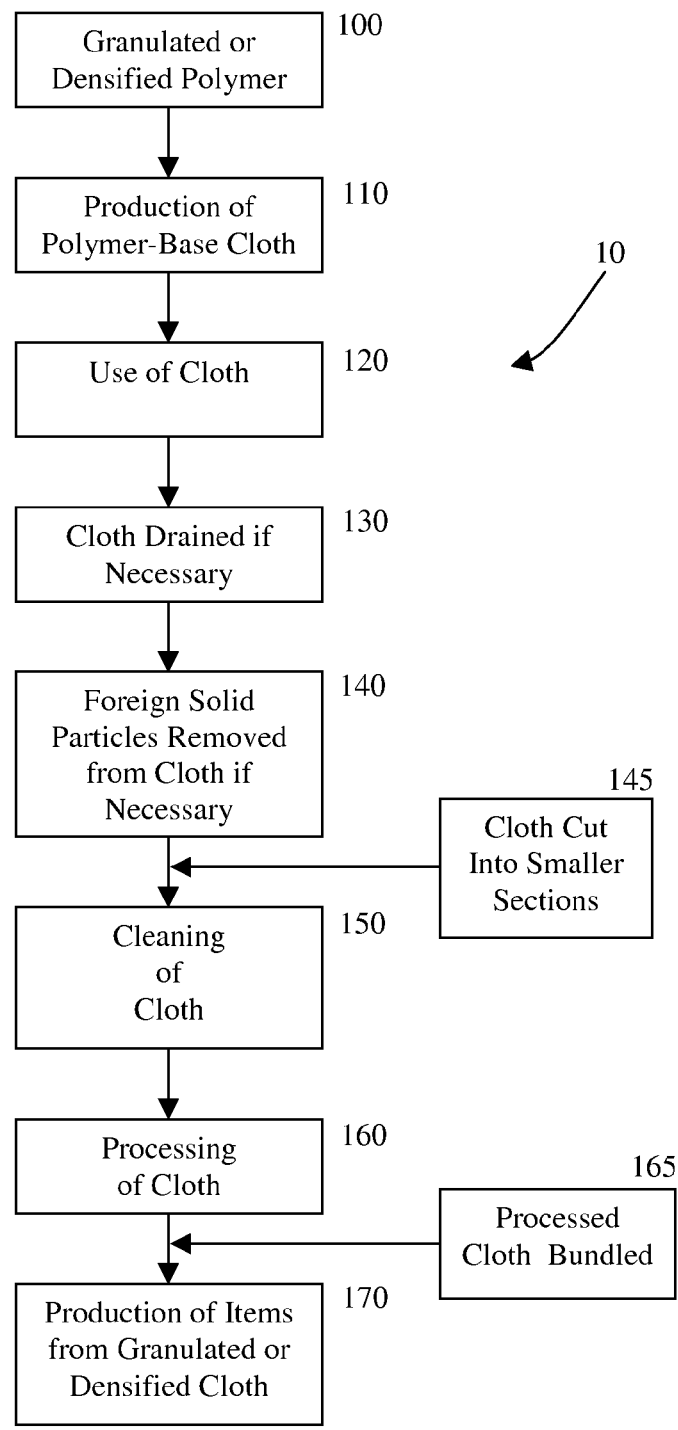
FIG. 1 is a schematic diagram illustrating an embodiment of the present invention.

Turning to FIG. 1, an embodiment of a method to recycle polymer-base cloth is shown generally at reference numeral 10. As shown in this figure, granulated or densified polymer material at step 100 is used to produce polymer-base cloth at step 110. The cloth can be used as a filter media and arrest various types of suspended contaminants within an industrial and/or non-industrial system. After the use of the cloth at step 120 has been completed, the cloth can be drained of excess liquid if necessary at step 130 and the foreign solid particles removed at step 140. The cloth can be cleaned at step 150, thereby producing a cloth free of the system components which the filter media was placed in. Optionally, the cloth can be cut into smaller sections at step 145 before it is cleaned at step 150.

The clean cloth can be processed at step 160 with the processing including any method or methods of processing of spent polymer material known to those skilled in the art, illustratively including densifying and/or granulating. The processing of the cloth can result in the production of granules, fibers, powder, particles, pellets and the like, hereafter all of which is simply refereed to as particles. Once processed, the polymer-base material can be used for production of other polymer-base items at step 170, illustratively including items such as dunnage used for supporting and/or carrying parts/components, pallets, air panels used for air filtration, tile, mats and the like. In some instances, the processed cloth can be bundled at step 165 in order to provide efficient movement of the processed cloth from one location to another. Bundling of the processed cloth can be accomplished by bailing the particles, placing the particles in a container and the like.

It is appreciated that the polymer-base cloth can include woven cloth, nonwoven cloth, spunbond cloth, air laid cloth, wet laid cloth, thermal bonded cloth and combinations thereof. In addition, the cloth can be made from nylon, polyester, polypropylene and other polymer-base materials known to those skilled in the art. It is also appreciated that the cloth can be made from natural polymers such as cellulose derived from wood, hemp, beech wood, cotton, flax and the like, such cloth illustratively including paper, cotton fabric, linen and rayon.

Figure 2:
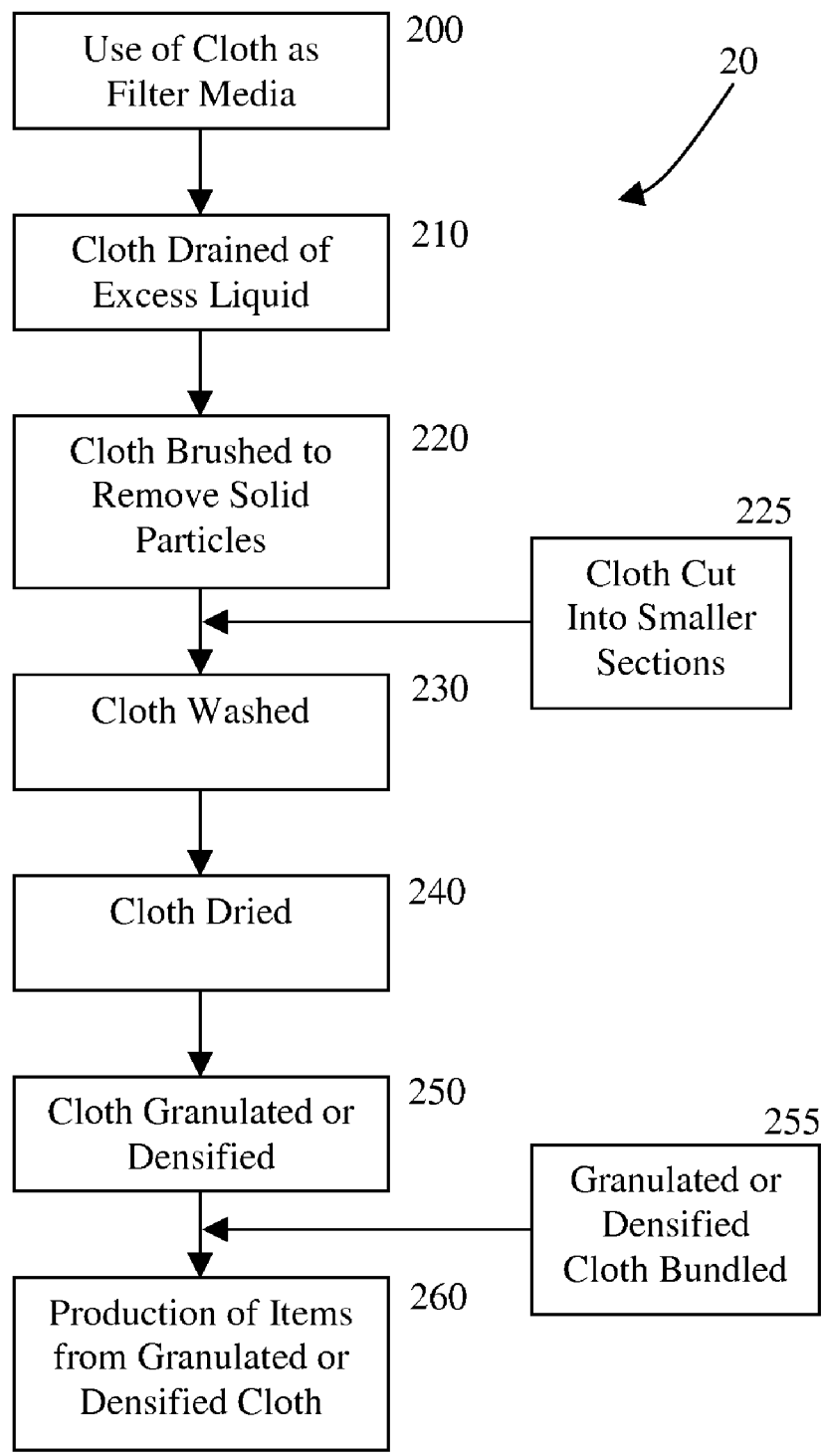
FIG. 2 is a schematic illustrating a different embodiment of the present invention.

Turning now to FIG. 2, another embodiment of a method to recycle polymer-base filter media is shown generally at reference numeral 20. In this embodiment, polymer-base cloth is used as a filter media at step 200. In some instances, solid particles are filtered from a lubricant by the filter media. Upon reaching a predetermined amount of use, the cloth can be drained of excess liquid at step 210. Thereafter, the cloth can be brushed to remove solid particles at step 220, optionally cut into smaller sections at step 225, washed at step 230 and dried at step 240. After the washing and drying of the cloth at steps 230 and 240, the cloth can be granulated or densified at step 250 in order to produce particles that fit or pass through a wire screen. After the granules or pellets have been produced at step 250, the recycled material can be bundled at step 255 and thereafter used to produce additional items at step 260. In some instances, the cloth is washed at step 230 by a dry cleaning, washing with soap and water, and the like. The soap, which can be used in the dry cleaning process and/or the soap and water process, can be a standard soap used to wash cloth, or in the alternative can be a specially formulated soap used to clean polymer-base cloth used in a particular system. Thereafter, the cloth is dried in a dryer for a period of time ranging from 1 minute to 1 hour and at a temperature ranging from 90° Fahrenheit to 200° Fahrenheit.

Figure 3:
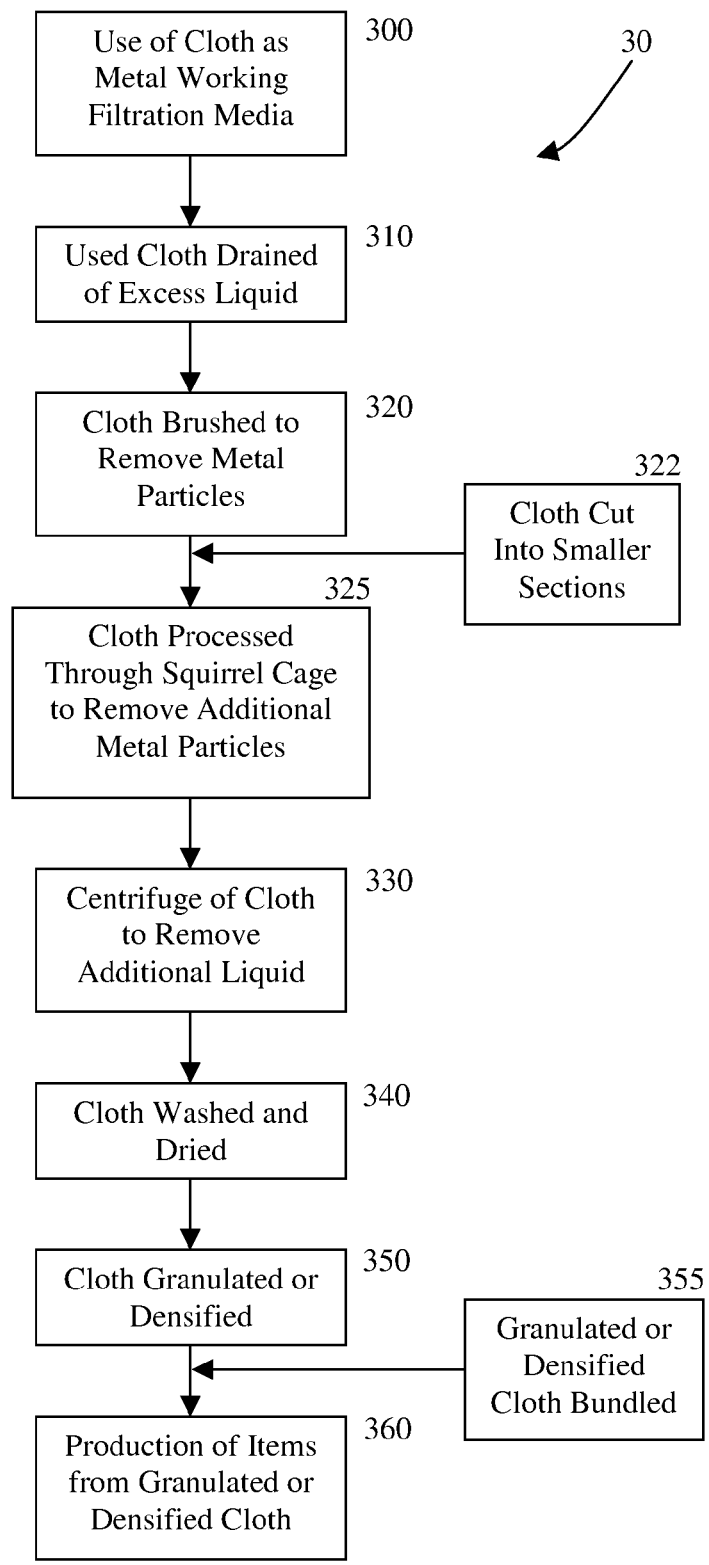
FIG. 3 is a schematic illustrating yet a different embodiment of the present invention.

Another embodiment of the method to recycle polymer-base filter media is illustrated in FIG. 3 and shown generally at reference numeral 30. In this embodiment, polymer-base cloth is used as metal working filtration media at step 300. The cloth can be supplied as large sheets and/or rolls of material which are used for a predetermined time and/or until a vacuum gauge indicates that the filtration capability has reached a predetermined level. The large sheets of cloth are used to filter metal particles from a lubricant in a metal working system, with additional clean cloth used to replace used or spent cloth that has been saturated with cutting fluid and/or metal particles from the metal working process. It is appreciated that spent cloth can include cloth used a predetermined amount, cloth that does not meet the appropriate specifications to be used as intended and thus is ready to be discarded and/or recycled. In addition, virgin polymer material can optionally be added to the spent material in order to make up a full batch for processing and still fall within the scope of the present invention.

Upon removal of the cloth from the metal working system, the cloth can be drained of excess liquid at step 310. The cloth can then be brushed to remove metal particles at step 320, cut into smaller sections at step 322 and then placed in a squirrel cage to remove additional metal particles at step 325. In some instances, a web of the cloth is pulled between rotating brushes to remove metal particles. The brushes can have bristles made from metals, alloys, plastics and the like. The cloth can be on a roller before being pulled between the rotating brushes and then rolled onto another roller after it has been brushed to remove metal particles at step 320. In some instances, the rolls of cloth can be between 48 inches to 120 inches long as measured along a longitudinal axis of the roll. The rolls of the polymer-base cloth can be cut into shorter rolls, for example 10 inches long. Additionally, the rolls can be cut along the longitudinal axis of the roll and thereby produce relatively small sized sheets. The rolls can be cut using any method known to those skilled in the art, illustratively including using a band saw, scissors, a shear, a laser, a water cutter, and the like. In some instances, the small sheets can be placed into a squirrel cage at step 325 in order to remove additional metal particles or metal chips, and then placed in the centrifuge at step 330. It is appreciated the term "squirrel cage" refers to a rotary cage with openings that afford for foreign material on or in the cloth to be removed. In the alternative, the process of rolling up the cloth and producing the small sheets can occur between the centrifuge step 330 and the washing and drying of the cloth at step 340.

Washing and drying of the cloth at step 340 affords for the removal of metal particles, lubricant, liquid, oil, etc., used in the metal working process. Once the cloth is clean, it can be granulated or densified at step 350. In some instances, the cloth is made from polyester and/or polypropylene and is granulated into particles that fit through or will pass through a ³⁄₁₆, ³⁄₈ or ½ inch screen. In other instances, the cloth is made from polypropylene and/or polyester and is densified. The granulated or densified particles can optionally be bundled at step 355. The granulated or densified particles can be gravity fed into a polymer injection mold machine and used to produce items at step 360.

It is appreciated that when hazardous solid particles and/or liquid are contained in the used polymer-base cloth, the dry cleaning process can be used to remove the particles and/or liquid from the cloth. For example, when cloth used as metal working filtration media contains lead (Pb) metal particles, a closed cycle dry cleaning system can be used to wash and dry the cloth at step 340 before it is granulated or densified at step 350. In this manner, hazardous materials are not released to the environment, water treatment system, and the like.

It is also appreciated that cloth made from natural polymers such as cellulose-base materials can be recycled after being used as filter media and fall within the scope of the present disclosure.

It is to be understood that various modifications are readily made to the embodiments of the present invention described herein without departing from the spirit and scope thereof. Accordingly, it is to be understood that the invention is not to be limited by the specific illustrated embodiment, but by the scope of the appended claims.

The invention claimed is:

1. A method of recycling spent filter media comprising:
providing a cloth, the cloth being spent polymer-base filter media;
rolling the spent polymer-base filer media into a roll;
removing foreign solid particles from the roll of cloth by unrolling the cloth and passing the cloth past and in contact with a rotating brush;
rolling the brushed cloth back into the form of a roll;
cutting the roll of cloth into a plurality of sections;
washing the plurality of cloth sections;
drying the plurality of cloth sections; and
processing the dried cloth to produce polymer-base particles, the particles selected from a group consisting of granules, pellets and combinations thereof, and used to produce a component.

2. The method of claim 1, wherein the processing of the dried cloth is selected from the group consisting of densifying and granulating.

3. The method of claim 1, wherein the cloth has been used as metal working filtration media.

4. The method of claim 1, further including removing the foreign solid particles from the cloth using a squirrel cage.

5. The method of claim 1, wherein the washing the cloth is dry cleaning the cloth.

6. The method of claim 1, wherein the washing the cloth is washing the cloth using soap and water.

7. The method of claim 6, further including bailing the polymer-base particles.

8. A method of making a component out of recycled polymer-base filter media cloth, the method comprising:
providing a cloth, the cloth being spent polymer-base filter media;
rolling the cloth into a roll;
removing foreign solid particles from the roll of cloth by unrolling the roll of cloth and passing the unrolled cloth between a pair of rotating brushes, the brushes mechanically removing the foreign solid particles from the cloth;

rolling the cloth that has passed between the pair of rotating brushes back into a roll;

cutting the roll of cloth into a plurality of sections such that a plurality of rectangular sheets of cloth are produced;

washing the rectangular sheets of cloth;

drying the rectangular sheets of cloth;

processing the rectangular sheets of cloth to produce polymer particles, the particles selected from a group consisting of granules, pellets and combinations thereof and the processing selected from a group consisting of granulating and densifying;

providing an injection molding machine;

placing the particles of polymer into the injection molding machine; and injection molding the particles of polymer to produce a component.

9. The method of claim 8, wherein the cloth has been used as a metal working filter media.

10. The method of claim 8, further including spinning the rectangular sheets of cloth in a squirrel cage in order to remove additional foreign solid particles from the cloth.

11. The method of claim 8, wherein washing the rectangular sheets of cloth is dry cleaning the rectangular sheets of cloth.

12. The method of claim 8, wherein the component is a dunnage for holding automotive parts.

13. The method of claim 10, wherein the component is a pallet.

* * * * *